Patented July 24, 1951

2,561,384

UNITED STATES PATENT OFFICE 2,561,384

DECAMETHYLENEDIAMINE SALT OF HEPARIN

John Lee, Essex Fells, and Leo Berger, Nutley, N. J., assignors to Hoffmann-La Roche Inc., Nutley, N. J., a corporation of New Jersey No Drawing. Application June 4, 1949, Serial No. 97,326

1 Claim. (Cl. 260—210)

The present invention is directed to a new heparin preparation characterized by high activity and long duration of action, and to a process for the manufacture thereof.

The invention also embraces a therapeutically useful aqueous solution containing the new heparin derivative described herein.

We have found that decamethylenediamine salt of heparin is relatively free from undesirable characteristics and displays a high activity and a long-acting effect. The compound may be made by reacting a water-soluble salt of decamethylenediamine with a water-soluble salt of heparin. Thus, the new compound may be prepared by reacting decamethylenediamine acetate with sodium heparin.

A specific illustrative embodiment is shown as follows:

65 grams of decamethylenediamine are dissolved in 500 cc. of methanol and 500 cc. of distilled water, and 50 cc. glacial acetic acid are added. The resulting decamethylenediamine acetate solution is clarified by filtration. A solution of 50 g. of sodium heparin is made in 700 cc. of distilled water at 40° C. To this 500 cc. of methanol are added and the resulting solution clarified by filtration. The solution of decamethylenediamine acetate is then added to the sodium heparin solution with rapid stirring causing the decamethylenediamine heparin salt to separate out and settle to the bottom as a gummy precipitate. This precipitate is collected by centrifuging and the gel obtained is washed with 50 percent methanol, three times with 100 percent methanol, and three times with dry acetone. The resulting decamethylenediamine heparin salt is collected and dried in vacuo. The product is a tan colored free flowing powder. Assay reflects a recovery of 98 percent to 100 percent of the initial amount of heparin units used.

Decamethylenediamine heparin is practically insoluble in water, but is soluble to the extent of 10 percent in 1 percent sodium chloride solution. A solution suitable for medicinal use is prepared by dissolving 10 g. of decamethylenediamine heparin in 100 cc. of water containing 1 g. of sodium chloride and 0.4 g. of phenol. The sodium chloride surprisingly facilitates solution of the heparin salt in water. The solution is sterilized by filtration and packaged in ampuls in the usual way.

We claim:

Decamethylenediamine salt of heparin.

JOHN LEE.
LEO BERGER.

REFERENCES CITED

The following references are of record in the file of this patent:

Scott et al., Transactions of the Royal Society of Canada, Sec. V, 3rd series, vol. 36, May 1942, pp. 49–51.

Charles, J. Biol. Chem., vol. 102, (1933), p. 442.

American Professional Pharmacist, vol. 8, No. 10, Oct. 1942, p. 629.